United States Patent
Kumar et al.

(10) Patent No.: US 11,882,638 B2
(45) Date of Patent: Jan. 23, 2024

(54) SYSTEM AND METHODS TO PROVIDE GROUP LIGHTING INTERACTION

(71) Applicant: SIGNIFY HOLDING B.V., Eindhoven (NL)

(72) Inventors: Rohit Kumar, Acton, NJ (US); Yizhou Zang, Malden, MA (US); Alexandru Darie, Lincoln, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 212 days.

(21) Appl. No.: 17/616,898

(22) PCT Filed: Jun. 15, 2020

(86) PCT No.: PCT/EP2020/066435
§ 371 (c)(1),
(2) Date: Dec. 6, 2021

(87) PCT Pub. No.: WO2020/254225
PCT Pub. Date: Dec. 24, 2020

(65) Prior Publication Data
US 2022/0312572 A1    Sep. 29, 2022

Related U.S. Application Data

(60) Provisional application No. 62/862,697, filed on Jun. 18, 2019.

(30) Foreign Application Priority Data

Sep. 25, 2019   (EP) .................................... 19199452

(51) Int. Cl.
*H05B 47/00*   (2020.01)
*H05B 47/115*   (2020.01)
(Continued)

(52) U.S. Cl.
CPC ......... *H05B 47/115* (2020.01); *H05B 47/135* (2020.01); *H05B 47/195* (2020.01)

(58) Field of Classification Search
CPC ...... H05B 47/00; H05B 47/10; H05B 47/105; H05B 47/115; H05B 47/135; H05B 47/14;
(Continued)

(56) References Cited

U.S. PATENT DOCUMENTS 8,698,646 B2    4/2014 Loveland et al.
11,076,470 B2 *   7/2021 Magielse ............... H05B 47/19
(Continued)

FOREIGN PATENT DOCUMENTS

WO    2012090142 A2    7/2012
WO    2019007802 A1    1/2019

*Primary Examiner* — Long Nguyen

(57) ABSTRACT

A system and methods are provided for group lighting interaction. A lighting infrastructure includes a plurality of simultaneously and independently controllable lighting devices. As various users request access to control the lighting infrastructure, the system and methods involve dynamically partitioning the lighting devices into subsets and then allocating each subset to a corresponding requesting user. The dynamic partitioning may be based on each user's respective location or the time each user requested access to control the lighting infrastructure.

15 Claims, 8 Drawing Sheets

(51) Int. Cl.
*H05B 47/135* (2020.01)
*H05B 47/195* (2020.01)

(58) Field of Classification Search
CPC .... H05B 47/155; H05B 47/175; H05B 47/19; H05B 47/195
See application file for complete search history.

(56) References Cited

U.S. PATENT DOCUMENTS

| | | |
|---|---|---|
| 2016/0345407 A1 | 11/2016 | Nolan et al. |
| 2016/0345414 A1 | 11/2016 | Nolan et al. |
| 2017/0148310 A1 | 5/2017 | De Bruijn et al. |
| 2017/0231064 A1 | 8/2017 | Lawrenson et al. |
| 2017/0265277 A1 | 9/2017 | Nolan et al. |
| 2019/0090329 A1 | 3/2019 | Chraibi et al. |
| 2020/0329546 A1* | 10/2020 | Krajnc ................... H05B 47/19 |

* cited by examiner

US 11,882,638 B2

SYSTEM AND METHODS TO PROVIDE GROUP LIGHTING INTERACTION

CROSS-REFERENCE TO PRIOR APPLICATIONS

This application is the U.S. National Phase application under 35 U.S.C. § 371 of International Application No. PCT/EP2020/066435, filed on Jun. 15, 2020, which claims the benefit of European Patent Application No. 19199452.4, filed on Sep. 25, 2019, and which claims the benefit of U.S. Provisional Patent Application No. 62/862,697, filed on Jun. 18, 2019. These applications are hereby incorporated by reference herein.

FIELD OF THE INVENTION

The invention relates to systems and methods for controlling a lighting infrastructure by a group of users who enter and leave the group.

BACKGROUND

Lighting infrastructures such as bridges, buildings, monuments, or other large-scale structures, are made up of multiple lighting devices. Each lighting device has the ability to be independently and simultaneously controlled. A lighting controller communicates with the lighting infrastructure to control each lighting device. A server interfaces with the lighting controller to allow an administrator to provide user input to control the lighting infrastructure.

An administrator who is given access to control the lighting infrastructure may execute commands such as, for example, "turn on" and "turn off." Because lighting infrastructures may be located in public areas, a user who accesses the lighting controller may require credentials before submitting commands or otherwise controlling the lighting infrastructure.

Multiple administrators may have credentials to control a lighting infrastructure, however, in such cases, only one administrator can control the lighting infrastructure at a time. For example, once an administrator logs out of the system, a new administrator with credentials may take over with complete access over the lighting infrastructure.

An administrator may utilize a client device over a cloud computing network to access the lighting controller. For example, a mobile phone, tablet, laptop, or desktop computer may communicate with the server that interfaces with the lighting controller. In this respect, the client device, server, and lighting controller are networked. The client device, server, and lighting controller communicate with one another using one or more communication protocols for sending and receiving data a control signals.

WO2012090142 entitled "Outdoor Lighting Network Control System" describes a control system enabling users to have a predetermined degree of control over certain features of an outdoor lighting network, including a plurality of user control apparatuses; a central control apparatus; lighting unit control apparatus; and a communication system operably connected between the user control apparatus, the central control apparatus, and the lighting unit control apparatus. Each of the user control apparatuses is operable to provide a control request in response to input from one of the users; the central control apparatus is operable to authenticate the control requests from the users, and resolve conflicts between the authenticated control requests for a lighting unit in an area of interest; and the lighting unit control apparatus for the lighting unit in the area of interest is operable to determine whether the resolved control request is valid, and execute the resolved control request when the resolved control request is valid.

There exists systems that address the situation where a first user is controlling the lighting infrastructure and a second user also desires to control the lighting infrastructure. In this case, prior art solutions involve conflict resolution to identify which user should have total control over the lighting infrastructure. The conflict resolution may involve considering factors such as, which user has the strongest received signal strength indicator or which user's device has the most compatible capabilities with the lighting infrastructure. Ultimately, the solution is to allow the most suitable user to control the lighting infrastructure.

The prior art lacks the ability to dynamically create partitions of a lighting infrastructure, particularly based on a user's location as well as other factors.

The present disclosure overcomes the problems in the prior art by providing the ability to dynamically create partitions of a lighting infrastructure. For example, partitions may be dynamically generated based on a user's location. The present disclosure provides a solution that supports large user groups whose membership continuously changes over time.

SUMMARY OF THE INVENTION

One aspect of the present invention is related to a computer-implemented method for controlling a lighting infrastructure. A computing system stores a set of lighting device identifiers in memory. Each of the lighting device identifiers corresponds to a lighting device installed in the lighting infrastructure. The computing system receives a first control request from a first client device. The first control request comprises a first location of the first client device. In response to the first control request, the computing system updates a mapping output by allocating the first client device to an initial subset of the lighting devices. The computing system receives a second control request from a second client device. The second control request comprises a second location of the second client device. In response to the second control request, the computing system updates the mapping output by reallocating the first client device to a first subset of the lighting devices based on the first location and by allocating the second client device to a second subset of the lighting devices of the lighting infrastructure based on the second location. The computing device transmits the mapping output to a lighting controller to permit the first client device to independently control the first subset of the lighting devices and to permit the second client device to independently control the second subset of the lighting devices while the first client device is permitted to independently control the first subset of the lighting devices.

Another aspect of the present invention relates to a computing system that includes a processor, a communication interface, and memory. The communication interface is configured to communicate with a lighting controller and a plurality of client devices. The memory stores a set of lighting device identifiers, where each lighting device identifier corresponds to a lighting device installed in the lighting infrastructure. The memory further stores computer instructions to execute the functionality described above.

One embodiment of the present invention relates the ability to handle a group of users that changes over time, where each group member requests access to control a lighting infrastructure. The computing system dynamically partitions the lighting devices of lighting infrastructure into subsets in response to receiving an additional control request from an additional client device. Moreover, when a user leaves the group, the computing system continues dynamically partitioning the lighting devices.

Another embodiment of the present invention is directed to authenticating a user who submitted a control request based on the user data contained in the control request. If the user is authenticated, the computing system transmits a permission to the user to permit the user to control at least a portion of the lighting infrastructure. Thereafter, the user may submit control signals to control a subset of the lighting devices that have been dynamically allocated to the user. The computing system transmits the control signal to the lighting controller.

Another embodiment of the present invention is directed to deriving the control signal based on how the user is manipulating the client device. For example, the client device may execute a mobile application that receives various user input. The user input may be, for example, a user selection of a color, user selection of an intensity, or a user selection of a predefined animation sequence, motion sensor output, or a camera output. These inputs may be used to generate a control signal for controlling at least some of the lighting devices installed in the lighting infrastructure.

Yet another embodiment of the present invention is directed to associating a timestamp with each control request. The computing system determines how to partition the lighting devices into subsets based on the timestamps. As a result, a user may be given a certain period of time to access a particular subset according to the timestamp. Moreover, the number of lighting devices of a given subset varies over time based on the timestamp.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 schematically shows an example of an embodiment of an interactive group lighting system, FIG. 2 schematically shows an example of communication between a client device and a computing system in the interactive group lighting system of FIG. 1, FIGS. 3*a*-3*c* depict various examples of partitioning lighting devices in the interactive group lighting system of FIG. 1, FIGS. 4*a*-4*c* depict various examples of partitioning lighting devices in the interactive group lighting system of FIG. 1, FIG. 5 schematically shows an example of data stored and processed in the interactive group lighting system of FIG. 1, FIG. 6 schematically shows an example of communication between a lighting controller and a computing system in the interactive group lighting system of FIG. 1.

DETAILED DESCRIPTION OF PREFERRED EMBODIMENTS

Figure 1:
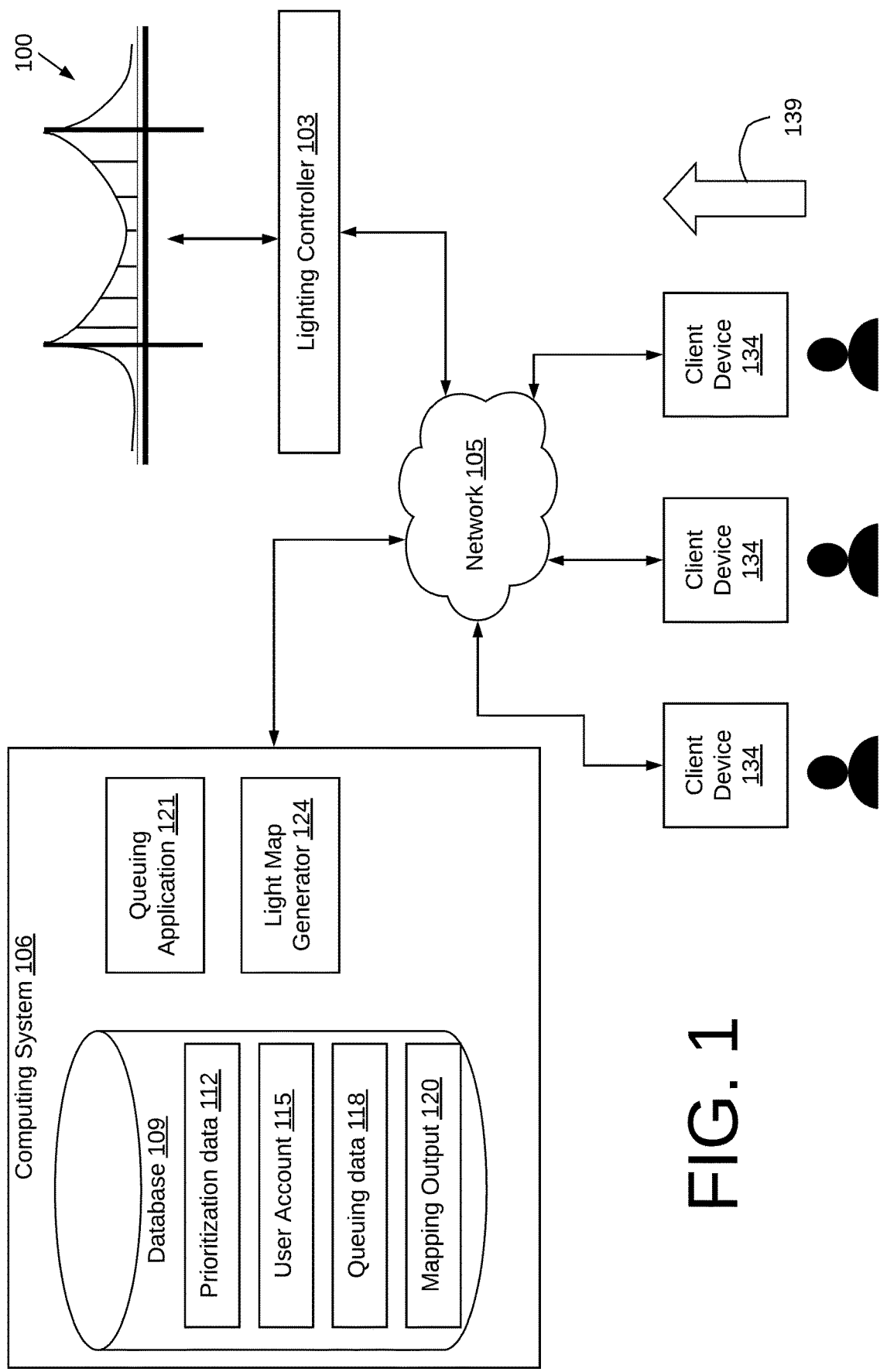

The embodiments shown in the drawings and described in detail herein should be considered exemplary of the principles of the invention and not intended to limit the invention to the specific embodiments shown and described herein.

In the following, for the sake of understanding, elements of embodiments are described in operation. However, it will be apparent that the respective elements are arranged to perform the functions being described as performed by them.

FIG. 1 schematically shows an example of an embodiment of an interactive group lighting system. FIG. 1 depicts a networked environment that includes a lighting infrastructure 100 that is controlled by a lighting controller 103. The lighting infrastructure 100 may be a bridge, building, monument, or other large scale structure. The lighting infrastructure 100 is made up of multiple lighting devices. A lighting device includes one or more light sources such as, for example, a light emitting devices (LED). Each lighting device is independently controllable and simultaneously controllable. Each lighting device is installed within the lighting infrastructure 100 to provide lighting at a large scale. The lighting controller 103 may be a device that controls each lighting device installed in the lighting infrastructure. In this respect, the lighting controller 103 communicates with the lighting devices of the lighting infrastructure using any communication protocol.

The lighting controller 103 communicates with other system components over a network 105. The network 105 includes the Internet, intranets, extranets, wide area networks (WANs), local area networks (LANs), wired networks, wireless networks, or other suitable networks, etc., or any combination of two or more such networks.

The interactive group lighting system of FIG. 1 further includes a computing system 106 connected to the network 105. The computing system 106 may comprise, for example, a server computer or any other system providing computing capability. Alternatively, the computing system 106 may employ a plurality of computing devices that may be arranged, for example, in one or more server banks or computer banks or other arrangements. Such computing devices may be located in a single installation or may be distributed among many different geographical locations. For example, the computing system may include a plurality of computing devices that together may comprise a hosted computing resource, a grid computing resource and/or any other distributed computing arrangement. In some cases, the computing system 106 may correspond to an elastic computing resource where the allotted capacity of processing, network, storage, or other computing-related resources may vary over time. The computing system 106 may implement one or more virtual machines that use the resources of the computing system 106.

The computing system 106 includes a database 109. Various data is stored in the database 109 or other memory that is accessible to the computing system 106. The database 109 may represent one or more databases 109. The data stored in the database 109 includes prioritization data 112, user accounts 115, queuing data 118, and a mapping output 120. Various applications and/or other functionality may be executed in the computing system 106. This includes, for example, a queueing application 121 and light map generator 124.

Also connected to the network 105 are a plurality of client devices 134 operated by different users. A client device may be, for example, a mobile phone, laptop, tablet, personal computer, or any other device providing client services to a user. The client device 134 includes an application that communicate with the computing system 106 over the network 105. The client device 134 is configured to send a control request 139 to the computing system. The control request 139 is a request to access at least a portion of the lighting infrastructure as part of an interactive group lighting experience. Next is a description of how the various components of FIG. 1 are configured to implement a group lighting system.

A user using a client device 134 may be near a lighting infrastructure 100 and wish to manipulate at least a portion of it. The client device 134 executes an application that allows the user to submit a control request 139 to the computing system 106 over the network 105. The computing system 106 executes a queuing application 121 to receive, handle, and process control requests 139. This may include authenticating each control request 139 using a user account 115. Because different control requests 139 are received from different client devices 134 over a period of time, the queuing application 121 is configured to prioritize requests according to a prioritization scheme.

When prioritizing control requests 139, the queuing application 121 generates queuing data 118. Queuing data 118 includes information pertaining to one or more control requests 139. For example, the queuing data includes an itemization of one or more control requests 139, information about the user making the control request 139, and the location of the user when making the request. The queuing application 121 may be configured to accept control requests for a timeslot that periodically occurs every 'n' minutes, where 'n' is a predefined number. The queuing application 121 processes the queuing data 118 to generate prioritization data 112. The prioritization data 112 indicates which control requests 139 are prioritized over others according to a prioritization scheme.

Once the queuing application 121 generates the prioritization data 112, thereby prioritizing the control requests 139, the light map generator 124 dynamically partitions the lighting devices of lighting infrastructure 100 into subsets. Then, the light map generator 124 allocates each client device 134 that submitted a control request 139 to a corresponding subset using the prioritization data 112. This allocation is stored as a mapping output 120. In this respect, the mapping output 120 is dynamically updated as different client devices submit control requests 139.

The light map generator transmits the mapping output 120 to the lighting controller 103 over the network. As users begin to control the lighting infrastructure 100, the lighting controller 103 applies each user's control information to a corresponding subset based on the mapping output 120. Embodiments of the process above are described in more detail in the following figures.

Figure 2:
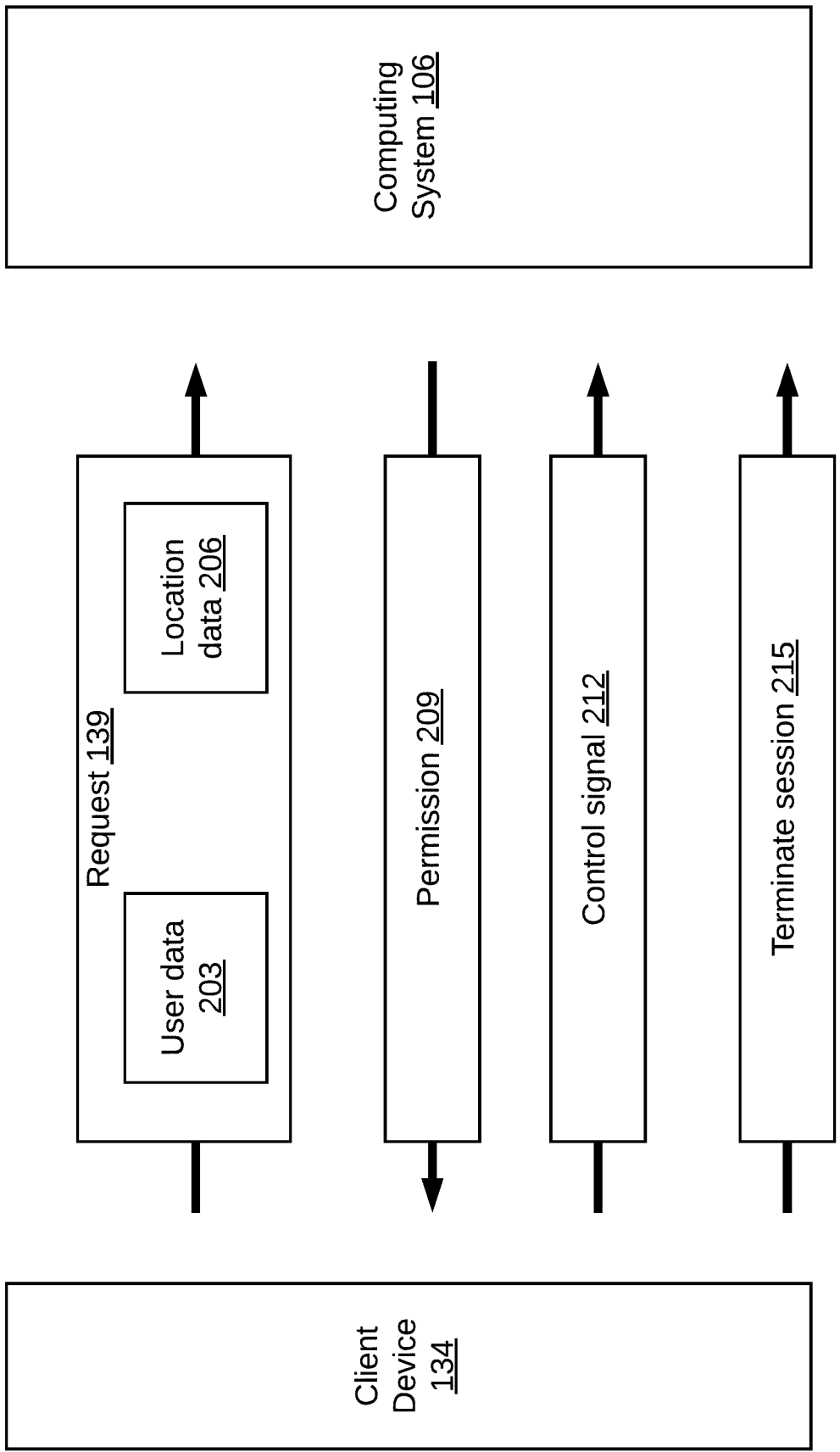

FIG. 2 schematically shows an example of communication between a client device and a computing system in the interactive group lighting system of FIG. 1. A client device 134 sends a control request 139 to computing system 106. According to an embodiment, the control request 139 includes user data 203 and location data 206. The user data 203 may include information identifying the user of the client device 134, such as, for example, a user identifier. Location data 206 may include location coordinates of the client device 134 that submitted the control request 139. For example, the client device may include a Global Position System (GPS) module that obtains GPS coordinates of the client device 134. When submitted the control request 139, the client device 134 accesses the GPS module to embed the GPS coordinates into the control request 139.

When the computing system 106 obtains the control request 139, the computing system 106 may authenticate the request. For example, the queuing application 121, which executes in the computing system 106, references user accounts 115 with the user data 203 to determine whether the client device 134 that submitted the control request 139 is associated with an authorized user. Thus, the queuing application 121 obtains information about the user who submitted the control request 139. This information may be used when generating prioritization data 112.

Upon authenticating the user, the computing system 106 transmits a permission 209 to the client device 134. The permission 209 authorizes the client device 134 to submit control signals 212 to the computing system 106. By granting a client device permission 209, a session is established. During the session, one or more control signals 212 are submitted by the user. The client device 134 provides an interface for the user to make different selections to generate the control signal 212. For example, the control signal may be based on a user selection of a color or intensity. The user may select a predefined animation sequence such as a particular light pattern that varies over time. A user may choose to turn a light on or off using the user interface. Upon a user selection, a corresponding control signal 212 is generated and transmitted to the computing system 106.

According to an embodiment, the client device 134 includes a motion sensor. The control signal 212 is derived from an output of the motion sensor. Depending on how the motion sensor senses the way the user moves the client device, a corresponding control signal 212 is generated. For example, moving the motion sensor upwards increases the intensity while moving it downwards reduces the intensity. The motion sensor generates a motion sensor output that is translated by the client device 134 into a corresponding control signal 212.

In another embodiment, the client device 134 includes a camera.

The control signal 212 is derived from an output of the camera. Depending on a digital image generated from the camera input, a corresponding control signal 212 is generated. For example, a facial recognition or pattern recognition may be applied to a digital image obtained from the camera to generate a corresponding control signal 212. For example, smiling may correspond to a turn-on-light control signal while frowning may correspond to a turn-off-light control signal.

The user may submit one or more control signals 212 as long as a session persists. In one embodiment, the user may end the session and transmit a terminate session message 215 to the computing device. After a session is terminated, the computing system 106 does not process any subsequent control signals 212 from the client device unless the user sends a subsequent control request 139. In other embodiments, the duration of a session is predetermined and therefore automatically terminated after a particular time period has elapsed.

Figure 3A:
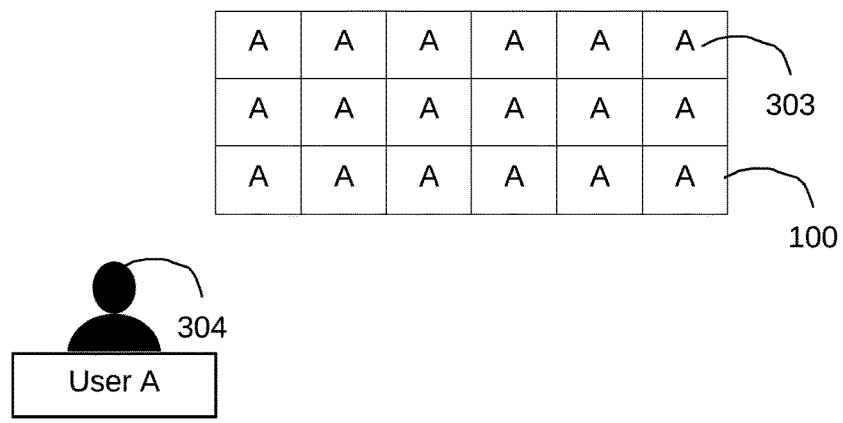
Figure 3B:
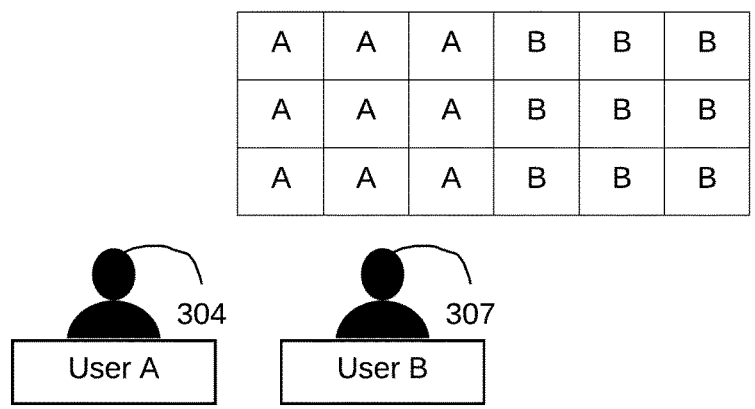
Figure 3C:
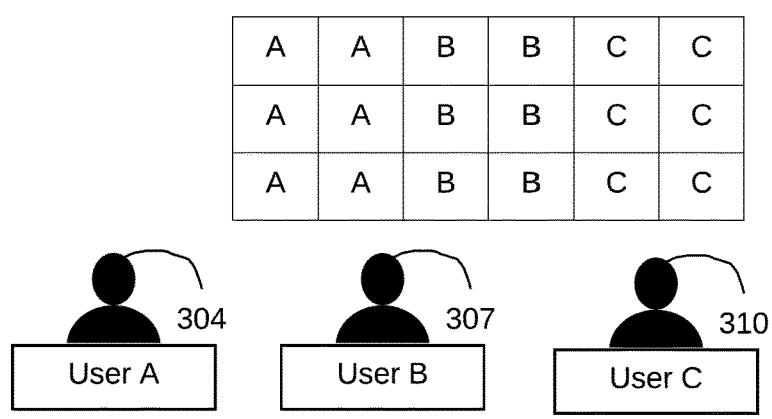

FIGS. 3a-3c depict various examples of partitioning lighting devices in the interactive group lighting system of FIG. 1. FIG. 3a depicts a lighting infrastructure 100 which includes a plurality of lighting devices 303. The lighting devices 303 may be organized in contiguous blocks of lighting devices installed in a lighting infrastructure 100 or may be organized discontinuously across the lighting infrastructure 100. In either case, FIG. 3a shows the relative location of lighting devices 303 respect to one another without showing the distances between the lighting devices 303.

In this example, there are eighteen lighting device 303 arranged spatially from left to right and from top to bottom. FIG. 3a also depicts a user 304 referred to as User A. User A positions herself towards the light side of the lighting infrastructure 100. User A submits a control request 139 to control at least a portion of the lighting infrastructure 100. A queuing application 121 of a computing system receives the control request 139 and updates the queuing data 118. In this example, the queuing data 118 indicates that only one user, User A has requested access and has established an active session. The queuing application 121 generates prioritization data 112. Because the queuing data 118 indicates only one active session with respect to User A, there is no priority to resolve and the prioritization data 112 indicates that User A has priority over the whole lighting infrastructure. The light map generator 124 partitions the lighting devices 304 into subsets based on the prioritization data 112. Here, the subset is equal to the entire set of lighting devices 304 of the lighting infrastructure 100. The light map generator 124 allocates the subset of all lighting devices 304 to User A. The light map generator 124 stores this allocation as a light map output 120 and transmits it to the lighting controller 103. When User A submits a control signal 212, the lighting controller 103 will reference the light map output 120 and apply the control signal 212 to all lighting devices allocated to User A.

FIG. 3b depicts an example that continues from the example of FIG. 3a. Here, in FIG. 3b, a second user 307, referred to as User B, positions himself towards the right of User A. User B submits a control request 139 while User A has an active session with the lighting infrastructure 100. The queuing application 121 receives the control request 139 from User B and establishes a session with User B. The queuing data 118 is updated and accordingly the prioritization data 112 is updated. The prioritization data 112 indicates the location of each user 304, 307 and their respective location data 206.

The light map generator 124 dynamically partitions the lighting devices 303 into subsets based on the prioritization data 112. The example of FIG. 3b shows the generation of two subsets based on the prioritization data 112 indicating two simultaneous, active sessions. The light map generator 124 then allocates each subset to a respective user 304, 307 based on each user's location. Because User A is located to the left of User B, the subset to the left is allocated to User A and the subset to the right is allocated to User B. When User B sends a control signal 212, the lighting controller 103 will control the lighting devices 303 allocated to User B independently of how User A chooses to control the lighting infrastructure 100. FIG. 3b shows how the lighting devices 303 are equally partitioned according to the number of active sessions. However, as described below, other prioritization schemes may be applied based on other factors such as time of the request, payment by a user, a user's account rating, or other user account data.

FIG. 3c depicts an example that continues from the example of FIG. 3b. Here, in FIG. 3c, a third user 310, referred to as User C, positions himself towards the right of User B. User C submits a control request 139 while User A and User B have active sessions with the lighting infrastructure 100. The queuing application 121 receives the control request 139 from User C and establishes a session with User C. The queuing data 118 is updated and accordingly the prioritization data 112 is updated. The prioritization data 112 indicates the location of each user 304, 307, 310 and their respective location data 206. The example of FIG. 3 shows the generation of three subsets based on the prioritization data 112 indicating three active sessions. These subsets are dynamically generated based on the creation of a new session by new User C.

FIG. 3c shows an example of how each user's influence over the lighting structure 100 changes as new sessions with different users are established. In FIG. 3b, User B controlled nine lighting devices 303 and when User C joined, User B was allocated only six lighting devices 303.

Figure 4A:
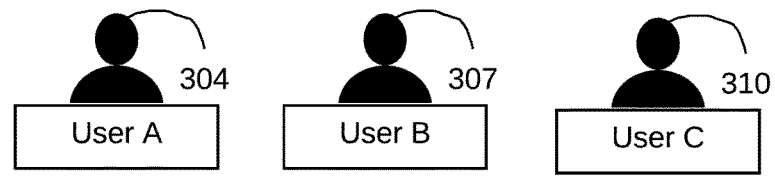
Figure 4B:
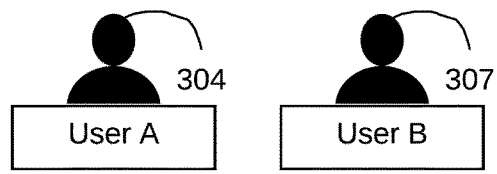
Figure 4C:
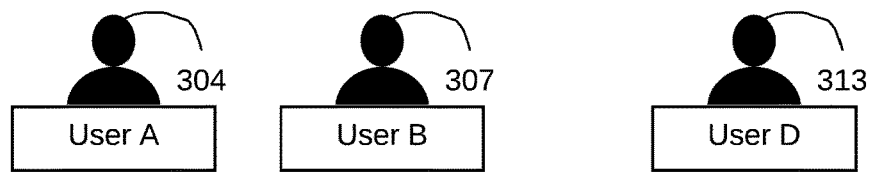

FIGS. 4a-4c depict various examples of partitioning lighting devices in the interactive group lighting system of FIG. 1. FIGS. 4a-4c show a prioritization scheme where subsets of lighting devices 303 are allocated based on session duration as well as other factors such as location. According to one embodiment, a control request 139 is associated with a timestamp that indicates a time the control request 139 was received by the computing system 106. This timestamp is used to determine the duration of a session. The light map generator 124 dynamically partitions the lighting devices 303 into subsets and allocates those subsets to users based on the number of active sessions as well as the duration of each session. In this respect, the number of lighting devices 303 for a given subset varies over time.

FIG. 4a shows three users, User A, User B, and User C, each having an active session with the lighting infrastructure 100. User A joined first, then User B, then User C. The queuing application 121 tracks the order and session duration based on timestamps associated with each control request 139. Because User A has the longest active session, User A is allocated the largest subset, which includes seven lighting devices 303. User B is allocated six lighting devices 303, and User C, who was last to join, is allocated five lighting device 303. FIG. 4a shows how session duration is proportional to the size of the allocated subset. However, according to other embodiments, session duration may be inversely proportional to the size of the allocated subset. Moreover, the light map generator 124 may limit the size of the subset to prevent a single user from taking too much control over the lighting infrastructure 100.

FIG. 4b depicts an example that continues from the example of FIG. 4a. User C's session has been terminated leaving User A and User B with the only active sessions. In response to User C leaving the group, the queuing data 118 and prioritization data 112 are updated to reflect two active sessions where the session associated with User A is longer than the session associated with User B. The update to the queuing data 118 and prioritization data 112 may take place at the timeslot that occurs after User C's session ended. For example, if a one-minute time slot is applied and User C's session ended in the first minute, then the queuing data 118 and prioritization data 112 will be updated at the beginning of the second minute. For the time between User C's session ending and the next time slot, a default control may be generated for the subset that was allocated to User C. The default control may be a control to turn on all lights for the subset, turn off all lights for the subset, or play a default animation for the subset such as, for example, a fade out animation.

In response to the updated prioritization data 112, the light map generator 124 dynamically partitions the lighting devices 303 into two subsets and allocates them to User A and User B based on the respective session durations. As a result, User A is allocated ten lighting devices 303 while User B is allocated eight lighting devices 303.

FIG. 4c depicts an example that continues from the example of FIG. 4b. A fourth user 313, referred to as User D has joined the group such that there are three active sessions. The light map generator 124 dynamically partitions the lighting devices 303 into three subsets and allocates them to User A, User B, and User D based on their respective session durations. When comparing FIG. 4c to FIG. 4a, User A's session duration is longer in FIG. 4c than in FIG. 4a. As a result, User A has a larger subset in FIG. 4c when compared to FIG. 4a. The same result applies to User B.

Figure 5:
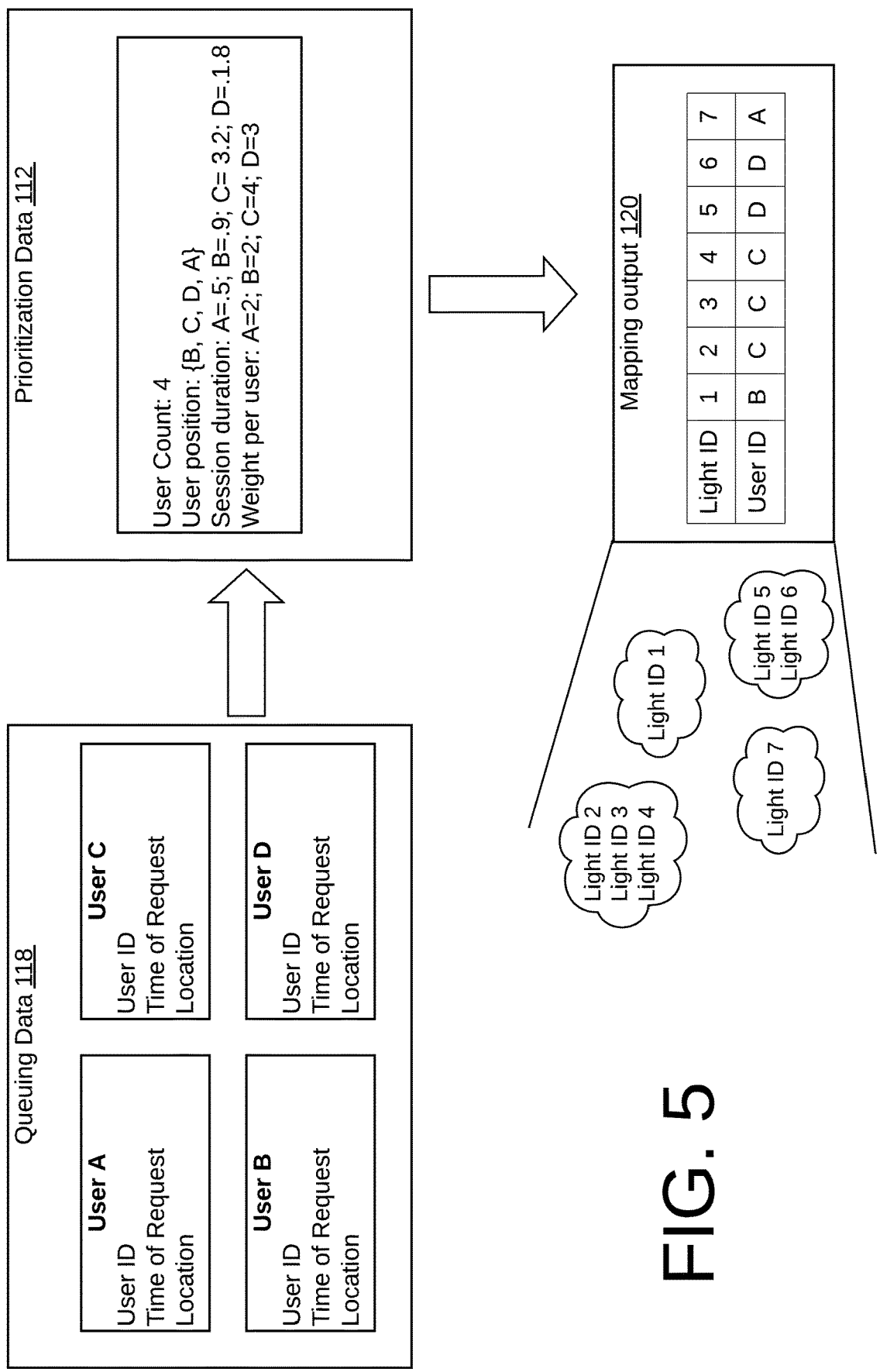

FIG. 5 schematically shows an example of data stored and processed in the interactive group lighting system of FIG. 1. Specifically, FIG. 5 shows a queuing application 121 that generates queuing data 118 and determines prioritization data 112 from the queuing data 118. FIG. 5 also shows a light map generator 124 that generates a mapping output based on the prioritization data 118.

The queueing data 118 comprises data reflecting each active session. In other words, it indicates a current group of users who have permission to control at least a portion of the lighting infrastructure 100. For each user, the queuing data 118 includes a user ID, timestamp, location. Information about each user may also reside in user accounts 115. When a new user is added to the group or when a user leaves the group, the queueing data 118 is updated dynamically.

The queuing application 121 analyzes the queueing data 118 and generates prioritization data 112. The prioritization data 112 reflects an analysis of the queuing data 118 to assist the light map generator 124 to partition the lighting devices 303 into subsets and allocate them to each user. The prioritization data 112 includes, for example, the number of users in the group, the geographical relationship between each user (e.g., their position from left to right), and the duration of each user's session.

The prioritization data 112 may include a weight calculation that corresponds to how much one user's control should be prioritized over others. For example, the session duration may impact the weight calculation. In one embodiment, a user is prompted to pay a fee to control the lighting infrastructure 100 as part of a bidding process. The user's payment may be included in the control request 139. The weight calculation may account for whether the user paid and/or how much the user paid. In another embodiment, the weight calculation accounts for the number of times a user as previously submitted control requests 139. In this embodiment, a user account 115 stores a history of a user's interaction with the lighting infrastructure 100. The weight calculation may depend on the user's history such that, for example, frequent control requests 139 reduces the weight calculation for a particular user. In other embodiment, the weight calculation may be based on a user's location, thereby prioritizing some locations over others. The weight calculation may also be based on a community rating. Celebrated users that are becoming known for their positive effects in a community are granted special access or speed access. The user account 115 may store a user's rating.

The light map generator 124 generates the mapping output 120. The computing system 106 stores a lighting device identifier for each lighting device 303 installed in the lighting infrastructure 100. The mapping output 120 maps each lighting device identifier to a corresponding user. To generate the mapping output 120, the light map generator 124 partitions the lighting devices 303 into subsets and then allocates each subset to a corresponding user. In the example of FIG. 5, the light map generator 124 creates four subsets of lighting devices 303. The first subset includes lighting device ID 1, the second subset includes lighting device IDs 2, 3 and 4, the third subset includes lighting device IDs 5 and 6, and the fourth subset includes lighting device ID 7. Then the light map generator 124 allocates each subset to a user. Here, the first subset is allocated to User B, the second subset is allocated to User C, the third subset is allocated to User D, and the fourth subset is allocated to User A.

The light map generator 124 uses the prioritization data 112 to partition the lighting devices 303 into subsets and allocate each subset to a corresponding user. In the example of FIG. 5, the light map generator 124 creates four subsets of lighting devices 303 based on the prioritization data indicating four users with active sessions. Next, the light map generator 124 partitions the subsets for each user based on their relative position. Stored in memory is information that maps each lighting device ID to the location of its corresponding lighting device. In this example, lighting device IDs 1-7 are associated with locations that span from left to right, respectively. The prioritization data 112 indicates the order from left to right of the four users are User B, User C, User D, and User A. Based on this information, the light map generator 124 will partition the subsets for each user according to this order such that the left most lighting device will be part of a subset allocated to User B and the right most lighting device will be part of the subset allocated to User A.

The size of the subset (e.g., the number of lighting devices in the subset), is based on the calculated weight contained in the prioritization data 112. In the example of FIG. 5, User C is associated with the highest weight compared to the other users. Accordingly, the light map generator 124 will create the largest subset of lighting devices for User C. As noted above, the weight calculation may be made according to one or more prioritization schemes based on, for example, whether the user paid a fee or the size of the fee, the duration of the session, the user's community rating, and/or the user's history in previously interacting with the lighting infrastructure 100.

The mapping output 120 is dynamically updated in response to changes in the prioritization data 112. The prioritization data is dynamically updated in response to changes in the queuing data 118. According to one embodiment, the queuing data 118 and/or prioritization data 112 is updated according to periodic timeslots. In this respect, the queuing application 121 processes control requests 139 on an "n" minute periodic window such that the queuing data 118 and/or prioritization data 112 is updated according to all control requests 139 received in the prior periodic window.

Figure 6:
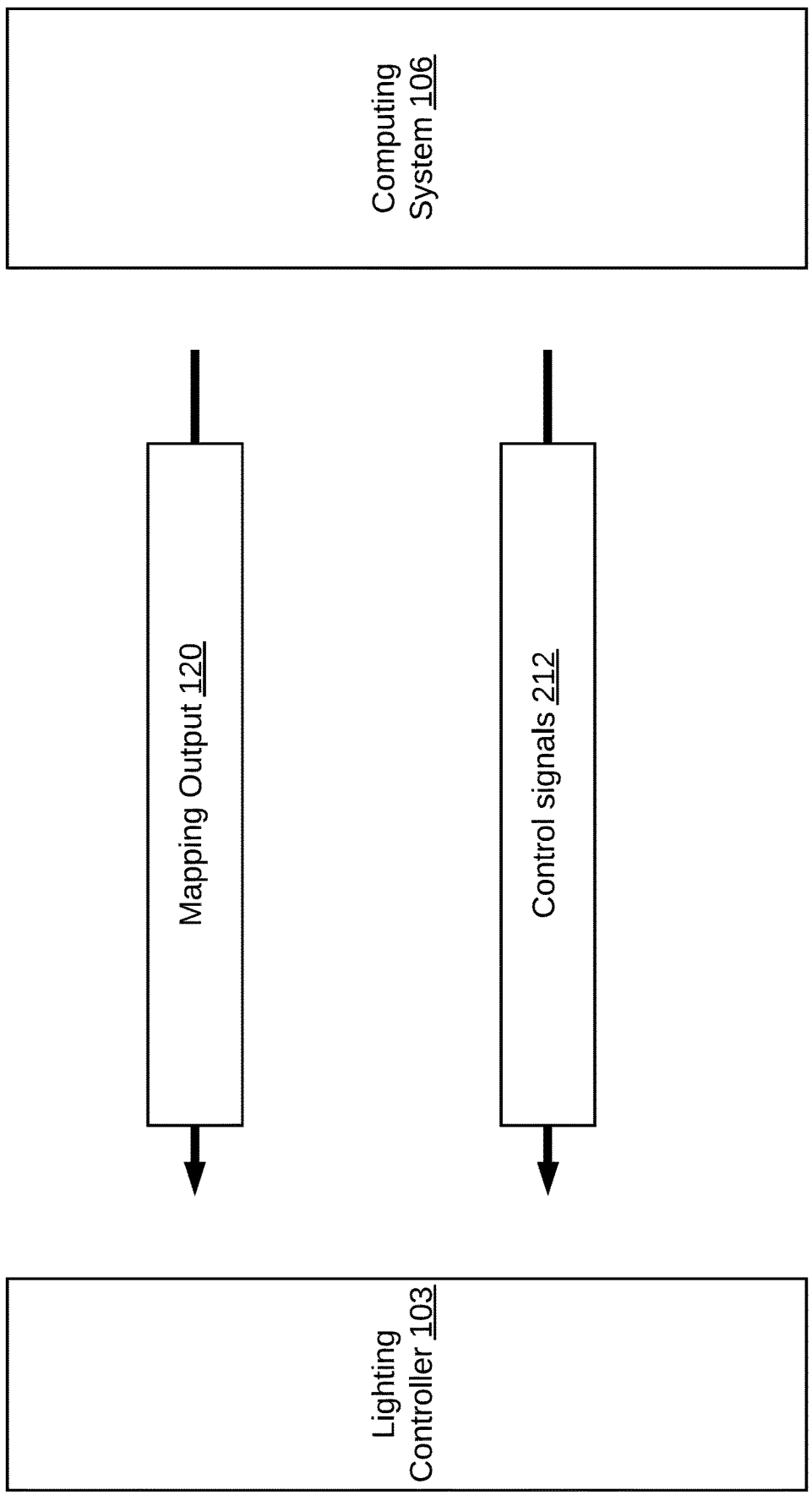

FIG. 6 schematically shows an example of communication between a lighting controller and a computing system in the interactive group lighting system of FIG. 1. The computing system 106 dynamically updates a mapping output 120 and transmits it to the lighting controller 103. The mapping output 120 may be a file that organizes the lighting devices 303 of a lighting infrastructure 100 into one or more subsets and then allocates each subset to a user. The lighting controller 103 is configured store the mapping output 120 and wait for control signals 212. The computing system 106 transmits a control signal 212 to the lighting controller 103, where the control signal 212 includes a reference to a user. The lighting controller receives the control signal 212 and identifies the applicable user associated with the control signal 212. The lighting controller 103 references the mapping output 120 and applies the control signal to the subset of lighting devices 303 allocated to the user who is associated with the control signal 212.

Figure 7:
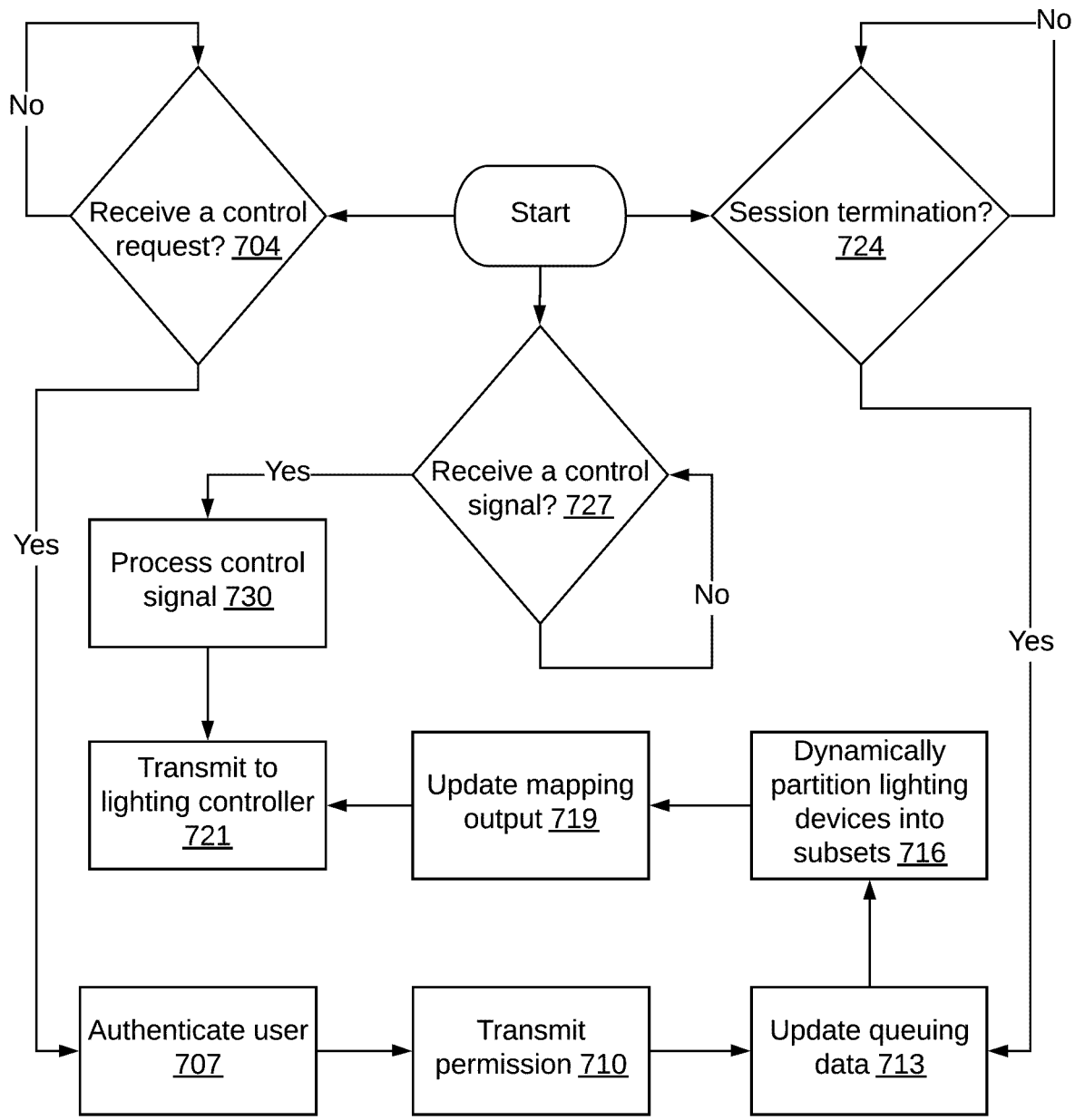
FIG. 7 is a flowchart illustrating an example of the functionality performed by a computing system in the interactive group lighting system of FIG. 1, and FIG. 8 schematically shows an embodiment of a computing system in the interactive group lighting system of FIG. 1.

FIG. 7 is a flowchart illustrating an example of the functionality performed by a computing system in the interactive group lighting system of FIG. 1. At 704, the computing system waits to receive a control request 139. When a control request 139 is received, at 707, it authenticates the user. For example, the computing system 106 authenticates the user based on the user data included in the control request 139, where the user data identifies the user who sent the control request 139. The computing system 106 may access a user account 115 to authenticate the user based on the user data. At 710, the computing system 106 transmits a permission 209 to the client device 134 that sent the control request 139 to permit the user to control at least a portion of the lighting infrastructure 100.

At 713, the computing system 106 updates queuing data 713 to record that a new user has joined the group and therefore has established an active session. The computing system 106 may generate prioritization data 112 to determine how lighting devices 303 should be partitioned. At 716, the computing system 106 dynamically partitions lighting devices 303 into one or more subsets. The computing system 106 stores a set of lighting device identifiers in memory, where each lighting device identifier corresponds to a lighting device 303 installed in the lighting infrastructure 100. At 719, the computing system updates a mapping output 120. The mapping output 120 records the allocation of the client device 134 that sent the control request 139 to one of the subsets of the lighting devices 303. At 721, the computing system 106 transmits the mapping output 120 to the lighting controller 103.

While the computing system 106 waits to receive a control request, the computing system 106 also waits for a session termination at 724. The computing system 106 may receive a terminate session message 215 from a client device 134 or it may automatically terminate a session in response to an event such as, for example, the expiration of a session after a predetermined period of time. When a session is terminated, the computing system 106 updates the queuing data 118 as shown at 713. This leads to dynamically partitioning the lighting devices 303 into new subsets. For example when a session is terminated, a user leaves the group, thereby allowing the current group members to gain greater access control to the lighting infrastructure 100.

In addition, the computing system 106 waits to receive a control signal at 727. A control signal 212 may be received from any client device 134 that has established an active session and is thereby in the group. The control signal 212 indicates the client device 134 that send the control signal. At 730 the computing system 106 processes the control signal 212. Processing may include reformatting, encrypting, embedding additional data, and/or removing unnecessary data. In any case, the control signal 212 that has been processed is transmitted to the lighting controller 721. The lighting controller 721 can independently control a subset of lighting devices that has been allocated to the user who sent the control signal 212.

Figure 8:
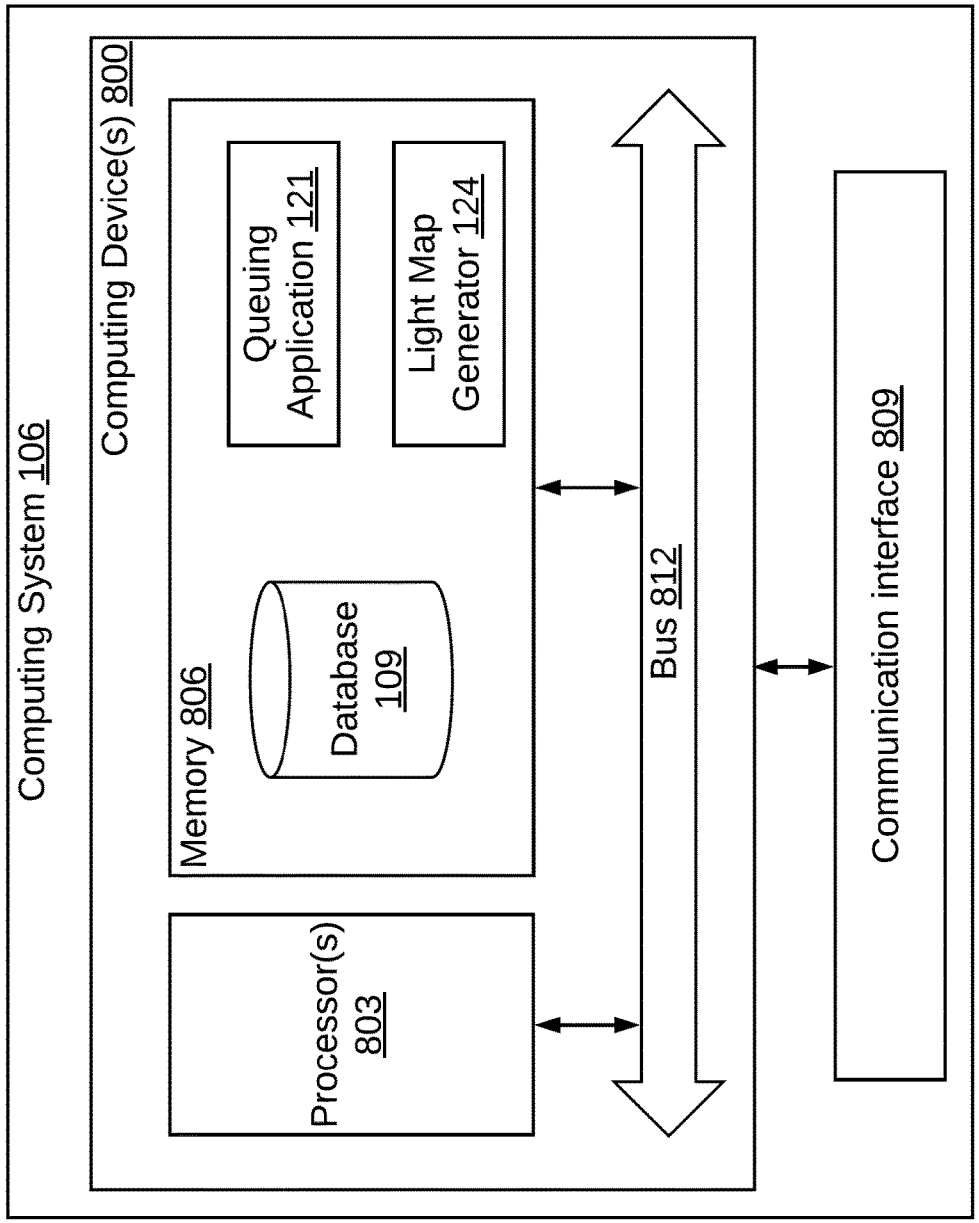

FIG. 8 schematically shows an embodiment of a computing system in the interactive group lighting system of FIG. 1. The computing system 106 includes one or more computing devices 800. Each computing device 800 includes at least one processor circuit, for example, having a processor 803, a memory 806, and a communication interface 809, each of which are coupled to a local interface 812 or bus. Each computing device 800 may comprise, for example, at least one server computer or like device. The communication interface 809 may include hardware, such as, for example, a network interface card, a modem, a transceiver, or radio and/or may include software such as, for example, a software module that encodes/decodes communication packets for transmission and receipt. The local interface 812 may comprise, for example, a data bus with an accompanying address/control bus or other bus structure as can be appreciated.

Stored in the memory 806 are both data and several components that are executable by the processor 803. In particular, stored in the memory 806 and executable by the processor 803 is the queueing application 121 and light map generator 124. Also stored in the memory 806 may be a database 109 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, Flash®, or other programming languages.

Several software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 812 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the software applications such as, for example, the queuing application 121 and the light map generator 124 as described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The communication interface 809 is configured to communicate with the lighting controller 103 and a plurality of client devices 134. The processor 803 uses the communication interface to establish communication with components external to the computing system 106. For example, the processor 803 may send instructions to the communication interface 809 to cause the transmission of data to the lighting controller 103 or client devices 134. Similarly, data received from the communication interface 809 is forwarded to the processor 803.

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, in regard to the various functions performed by the above described components (devices, systems, and the like), the terms (including a reference to a "means") used to describe such components are intended to correspond, unless otherwise indicated to any component such as hardware or combinations thereof, which performs the specified function of the described component (i.e., that is functionally equivalent), even though not structurally equivalent to the disclosed structure which performs the function in the illustrated implementations of the disclosure.

Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method for controlling a lighting infrastructure, the method comprising the steps of:
   storing a set of lighting device identifiers in memory, each lighting device identifier corresponding to a lighting device installed in the lighting infrastructure;
   receiving a first control request from a first client device, the first control request associated with a first location of the first client device;
   in response to the first control request, updating a mapping output by allocating the first client device to an initial subset of the lighting devices;
   receiving a second control request from a second client device, the second control request associated with a second location of the second client device;
   in response to the second control request, updating the mapping output by reallocating the first client device to a first subset of the lighting devices based on the first location and by allocating the second client device to a second subset of the lighting devices based on the second location; and
   transmitting the mapping output to a lighting controller to permit the first client device to independently control the first subset of the lighting devices and to permit the second client device to simultaneously and independently control the second subset of the lighting devices.

2. The method of claim 1, wherein the first control request comprises user data that identifies a user of the first client device, wherein the method further comprises the steps of:
   authenticating the user based on the user data; and
   transmitting a permission to the first client device to permit the user to control at least a portion of the lighting infrastructure.

3. The method of claim 1, further comprising the steps of:
   receiving a control signal from the first client device to control at least a portion of the lighting infrastructure; and
   transmitting the control signal to the lighting controller, wherein the lighting controller controls a portion of the light infrastructure defined by the mapping output according to the control signal.

4. The method of claim 1, further comprising the step of:
   receiving a control signal from the first client device to control at least a portion of the lighting infrastructure, wherein the control signal is derived from at least one of a user selection of a color, a user selection of an intensity, or a user selection of a predefined animation sequence.

5. The method of claim 1, further comprising the step of:
   receiving a control signal from the first client device to control at least a portion of the lighting infrastructure, wherein the first client device comprises a motion sensor, and
   wherein control signal is derived from an output of the motion sensor.

6. The method of claim 1, wherein the first control request is associated with a first timestamp and the second control request is associated with a second timestamp, wherein the first subset and second subset are determined based on both the first timestamp and second timestamp.

7. The method of claim 6, wherein the number of lighting devices of the first subset varies over time based on the first timestamp.

8. The method of claim 1, further comprising the step of dynamically partitioning the lighting devices of lighting infrastructure into subsets in response to receiving an additional control request from an additional client device.

9. A computing system configured to communicate with a lighting controller that controls the lighting infrastructure, the system comprising:
   a processor;
   a communication interface configured to communicate with the lighting controller and a plurality of client devices; and
   a memory that stores a set of lighting device identifiers, each lighting device identifier corresponding to a lighting device installed in the lighting infrastructure, wherein the memory further stores computer instructions, which, when executed, cause the processor to:
   receive a first control request from a first client device, the first control request associated with a first location of the first client device;
   in response to the first control request, update a mapping output by allocating the first client device to an initial subset of the lighting devices;
   receive a second control request from a second client device, the second control request associated with a second location of the second client device;
   in response to the second control request, update the mapping output by reallocating the first client device to a first subset of the lighting devices based on the first location and by allocating the second client device to a second subset of the lighting devices based on the second location; and
   transmit the mapping output to a lighting controller to permit the first client device to independently control the first subset of the lighting devices and to permit the second client device to simultaneously and independently control the second subset of the lighting devices.

10. The system of claim 9, wherein the first control request comprises user data that identifies a user of the first client device, wherein the computer instructions, when executed, further causes the processor to:
    authenticate the user based on the user data; and
    transmit a permission to the first client device to permit the user to control at least a portion of the lighting infrastructure.

11. The system of claim 9, wherein the computer instructions, when executed, further causes the processor to:
    receive a control signal from the first client device to control at least a portion of the lighting infrastructure; and
    transmit the control signal to the lighting controller, wherein the lighting controller controls a portion of the light infrastructure defined by the mapping output according to the control signal.

12. The system of claim 9, wherein the computer instructions, when executed, further causes the processor to:
    receive a control signal from the first client device to control at least a portion of the lighting infrastructure, wherein the control signal is derived from at least one of a user selection of a color, a user selection of an intensity, or a user selection of a predefined animation sequence.

13. The system of claim 9, wherein the first control request is associated with a first timestamp and the second control request is associated with a second timestamp, wherein the first subset and second subset are determined based on both the first timestamp and second timestamp.

14. The system of claim 13, wherein the number of lighting devices of the first subset varies over time based on the first timestamp.

15. The system of claim 9, wherein the computer instructions, when executed, further causes the processor to:
    dynamically partition the lighting devices of lighting infrastructure into subsets in response to receiving an additional control request from an additional client device.

* * * * *